United States Patent [19]
Jakob et al.

[11] Patent Number: 6,054,519
[45] Date of Patent: Apr. 25, 2000

[54] POLYVINYL ALCOHOL COMPOSITIONS

[75] Inventors: Martin Jakob, Kelkheim; Richard Gutte, Frankfurt, both of Germany

[73] Assignee: Clariant GmbH, Frankfurt, Germany

[21] Appl. No.: 08/924,732

[22] Filed: Sep. 5, 1997

[30] Foreign Application Priority Data

Sep. 9, 1996 [DE] Germany .................. 196 36 510

[51] Int. Cl.⁷ .................. C08K 5/07; C08L 29/04; C08G 63/91

[52] U.S. Cl. .................. 524/354; 524/503; 524/563; 524/803; 525/61; 156/326

[58] Field of Search .................. 524/354, 503, 524/563, 803; 525/61; 156/326

[56] References Cited

U.S. PATENT DOCUMENTS

| | | | |
|---|---|---|---|
| 3,700,611 | 10/1972 | Nickerson et al. | 524/354 |
| 4,376,183 | 3/1983 | Haskell | 524/417 |
| 4,796,700 | 1/1989 | Sandiford et al. | 525/61 |
| 4,906,679 | 3/1990 | Tokuno et al. | 524/503 |
| 5,545,684 | 8/1996 | Jakob et al. | 524/354 |
| 5,777,015 | 7/1998 | Jakob et al. | 525/61 |

FOREIGN PATENT DOCUMENTS

| | | |
|---|---|---|
| 778290 | 6/1997 | European Pat. Off. |
| 778315 | 6/1997 | European Pat. Off. |
| 52-117991 | 10/1977 | Japan. |
| 5-163609 | 6/1993 | Japan. |
| 6-157860 | 6/1994 | Japan. |

OTHER PUBLICATIONS

C.A. Finch, "Chemical Reactions and Stereochemistry of Polyvinyl Alcohol", 1992, pp. 270–311.

*Primary Examiner*—Andrew E. C. Merriam
*Attorney, Agent, or Firm*—Foley & Lardner

[57] ABSTRACT

Polyvinyl alcohol compositions in the form of an aqueous solution are disclosed, where the aqueous polyvinyl alcohol compositions include: (i) polyvinyl alcohol; (ii) at least one polyaldehyde having at least 3 carbon atoms and being masked completely as a water-soluble hydrogen sulfite adduct; and (ii) at least one compound which is acidic in water. The aqueous polyvinyl alcohol compositions are suitable as adhesives and for use in cast films.

15 Claims, No Drawings

POLYVINYL ALCOHOL COMPOSITIONS

BACKGROUND OF THE INVENTION

1. Field of the Invention

The invention relates to self-crosslinking polyvinyl alcohol compositions in the form of aqueous solutions having an extended stability on storage, to a process for their preparation and to their use for preparing films that crosslink at room temperature. Specifically, the invention relates to methods for preparing sheets and adhesive bonds that are resistant to boiling water.

2. Description of Related Art

Adhesives based on polyvinyl alcohol are known in the prior art. Due to their adhesive force, they can be used in the form of aqueous solutions, and specifically as a raw material for bonding cellulosic substrates such as wood, paper or cards. Examples of such fields of application include the preparation of special paper laminates and spiral or parallel sleeves. Alongside a wide range of other applications, polyvinyl alcohol films also are used as packaging materials, in which context they are used on their own or else as a constituent of laminates in composite films.

A known disadvantage of these applications lies in the hydrophilicity of the polyvinyl alcohol. When polyvinyl alcohol is used as an adhesive film, there typically is poor water resistance of the adhesive bonds or, when it is used in films, it produces an inadequate barrier effect to oxygen under conditions of high gas humidity. By using fully hydrolyzed polyvinyl alcohols which are insoluble in cold water it is possible, for example, for use as a paper adhesive, to bring about a certain level of resistance to the action of cold water. Adhesive bonds resistant to boiling water, however, are not obtainable, nor are water-resistant adhesive films or cast films formed from the easy-to-prepare aqueous solutions of partially hydrolyzed polyvinyl alcohols which are soluble in cold water.

It is known in principle to reduce the sensitivity to water of polyvinyl alcohol by means of a large number of possible reagents, for example, using bifunctional aldehydes (see, Finch, C. A., POLYVINYL ALCOHOL, C. A. Finch (Ed); John Wiley and Sons, New York (1992), Chap. 9).

Polyvinyl alcohol films which are resistant to boiling water and are suitable as a flexible packaging material can be prepared, according to U.S. Pat. No. 4,376,183, from an aqueous composition which comprises in aqueous form dissolved polyvinyl alcohol, dialdehydes capable of crosslinking, and, dispersed in this solution, metal orthophosphates, preferably of aluminum or iron. The resistance to hot water arises after heat treatment.

JP-A 117991/77 (Chemical Abstracts 88:74939) describes the preparation of polyvinyl alcohol molding compounds from aqueous solutions by crosslinking with difunctional aldehydes having at least 3 carbon atoms in the presence of acidic catalysts, including salts, and subsequent heat treatment at 50° C. These polyvinyl alcohol molding compositions are resistant to boiling water.

The resistance to boiling water of wet-spun polyvinyl alcohol fibers can be improved according to JP-A 163609/93 (Chemical Abstracts 119:141112) by treating them with dialdehydes, such as glutaraldehyde, or acetals of dialdehydes, for example tetramethoxypropane, in a medium acidified with sulfuric acid. The aqueous polyvinyl alcohol solution includes boric acid added prior to spinning.

Water-resistant polyvinyl alcohol compositions suitable for adhesives and sizes are described by JP-A 157860/94 (Chemical Abstracts 121:257180). In addition to polyvinyl alcohol, these compositions comprise chitosan, aldehydes, for example glyoxal, reducing agents and free-radical scavengers, for example hydroquinone monomethyl ether. The group of reducing agents includes sulfur compounds, including sodium hydrogen sulfite.

Despite the fact that the prior art provides access in principle to polyvinyl alcohol films that are resistant to boiling water, in the case of crosslinking by way of bifunctional aldehydes having at least 3 carbon atoms in an acidic medium, comparison Example 1 below shows that such compositions have a tendency to undergo rapid gelling, and are thus of only limited stability on storage. This feature is particularly detrimental to their use as an adhesive.

SUMMARY OF THE INVENTION

Thus, there exists a need to provide polyvinyl alcohol compositions in the form of aqueous solutions which feature an extended stability on storage of at least four weeks and from which it is possible to prepare, on drying, preferably even at room temperature, films having a high level of resistance to boiling water. It is accordingly an object of the present invention to provide aqueous polyvinyl alcohol compositions that are storage stable and that are resistant to boiling water.

In accordance with this and other objects of the invention, there is provided polyvinyl alcohol compositions in the form of aqueous solutions that, in addition to polyvinyl alcohol, comprise at least bifunctional aldehydes that have at least 3 carbon atoms and that are completely masked in the form of a water-soluble hydrogen sulfite adduct from which, by means of acidic compounds, aldehyde groups capable of crosslinking can be released in a controlled manner. Accordingly, the present invention provides a polyvinyl alcohol composition in the form of an aqueous solution comprising polyvinyl alcohol, at least one polyaldehyde having at least 3 carbon atoms which is masked completely as a water-soluble hydrogen sulfite adduct, and at least one compound which is acidic in water.

In accordance with an additional object of the present invention, there is provided a method of making aqueous polyvinyl alcohol compositions comprising admixing a polyvinyl alcohol with at least one polyaldehyde having at least 3 carbon atoms which is masked completely as a water-soluble hydrogen sulfite adduct, and at least one compound which is acidic in water. In accordance with yet another object of the invention, there is provided a method of making a water-soluble polyvinyl premix comprising admixing an at least partially water-soluble polyvinyl alcohol powder or granule with at least one polyaldehyde having at least 3 carbon atoms which is masked completely as a water-soluble hydrogen sulfite adduct and then drying. In accordance with yet another object of the invention, there is provided an adhesive or a film comprising an aqueous polyvinyl alcohol composition including polyvinyl alcohol, at least one polyaldehyde having at least 3 carbon atoms which is masked completely as a water-soluble hydrogen sulfite adduct, and at least one compound which is acidic in water.

These and other objects of the present invention will be readily apparent to those skilled in the art upon review of the detailed description that follows.

DETAILED DESCRIPTION OF PREFERRED EMBODIMENTS

Any polyvinyl alcohol may be used in the present invention. Preferably, polyvinyl alcohol that is useful in the present invention can be prepared in general by hydrolysis of polyvinyl acetate. Suitable polyvinyl alcohol preferably has a degree of hydrolysis of from 70 to 100 mol-% and a viscosity, as a 4% strength aqueous solution, of from 2 to 70 mPa·s. Polyvinyl alcohols having a degree of hydrolysis of from 80 to 98 mol-% preferably are used due to their solubility in water. Partially hydrolyzed polyvinyl alcohol soluble in cold water, with a degree of hydrolysis of about 88 mol-% and a viscosity, as 4% strength aqueous solutions, of 18–40 mPa·s are particularly preferred.

The concentration of polyvinyl alcohol in the aqueous solution, whose upper limit is set by the molecular weight of the polyvinyl alcohol, preferably is at least 0.1% by weight, based on the total weight of the composition. Depending on the degree of viscosity, it is preferred to operate in concentrations of from 2 to 30% by weight. Preference is given to operating with a 1 to 25% strength by weight solution, particularly preferably one having a concentration of from 5 to 15% by weight. The viscosity range of the finished composition, after the additives described below have been added, preferably is below 10,000 mPa·s, more preferably below 1000 mPa·s and, even more preferably, below 500 mPa·s. This viscosity can be achieved within the stated concentration ranges if the polyvinyl alcohols used have molecular weights such that the viscosity of their 4% strength aqueous solutions at 20° C. is between 4 and 30 mPa·s.

Any bifunctional aldehyde can be used in the present invention as long as it has at least 3 carbon atoms and as long as it can release aldehyde groups in an acidic medium whereby the aldehyde groups are capable of crosslinking. Examples of suitable, at least bifunctional aldehydes having at least 3 carbon atoms and being masked completely as hydrogen sulfite adducts, from which aldehyde groups capable of crosslinking can be released in a controlled manner in an acidic medium, include derivatives of malonaldehyde, succinaldehyde, 2-hydroxysuccinaldehyde, glutaraldehyde, 3-methylglutaraldehyde, 3-hydroxyglutaraldehyde, adipaldehyde, 2-hydroxyadipaldehyde, heptanedial, octanedial, nonanedial, decanedial and also cis- and trans-2-butenedial or polyacrolein and also dialdehyde starches. Suitable derivatives of these aldehydes include, for example, their adducts with alkali metal hydrogen sulfites. The term "completely masked" denotes that all aldeyhde groups of a molecule are blocked by hydrogen sulfite, i.e., that one $HSO_3^{\ominus}$ is present per aldehyde group. Particularly preferred components are the adducts of sodium or potassium hydrogen sulfite with glutaraldehyde and succinaldehyde, especially glutaraldehyde bis(sodium hydrogen sulfite) and succinaldehyde bis(sodium hydrogen sulfite). It is of course also possible to employ mixtures of different adducts. Those skilled in the art are capable of determining suitable derivatives of adducts of the aforementioned aldehydes, using the guidelines provided herein.

The amount of the at least one bifunctional aldehyde preferably is such that the molar ratio (of bisulfite adduct to vinyl alcohol units) is from 0.0001 to 0.5:1, more preferably from 0.005 to 0.05:1.

Any acidic compound can be used as long as it is capable of rendering the aqueous composition acidic so that the at least one bifunctional aldehyde adduct can release the aldehyde groups capable of crosslinking. Acidic compounds in the novel polyvinyl alcohol compositions preferably are either Brönsted acids or Lewis acids. Suitable Brönsted acids preferably include boric acid, meta-phosphoric acid, ortho-phosphoric acid or acidic salts of ortho-phosphoric acids. Brönsted acids which also are suitable have $pK_a$ values of less than 2.5, examples including aqueous mineral acids such as sulfuric acid or hydrochloric acid, or benzenesulfonic acid and p-toluenesulfonic acid. These acids can be used alone or together with the above-mentioned acids to establish a particular pH. Lewis acids that can be used preferably include water-soluble salts of polyvalent cations which in aqueous solution develop a hydrolysis equilibrium, especially salts of Cr(III), Al(III), Zr(IV) or Fe(III), examples being chromium(III) nitrate, aluminum chloride, aluminum nitrate, zirconium oxychloride or iron(III) chloride. It is of course also possible to employ mixtures of the above-mentioned compounds.

The amount of the acidic compound used preferably is such to provide a pH of below 6, more preferably below 4.5, and with particular preference from 1 to 3.5 in the polyvinyl alcohol composition. It is preferred to employ at least 0.001% by weight, in particular from 0.1 to 50% by weight, and even more preferably, from 10 to 50% by weight of the acidic compound, based on the mass of the polyvinyl alcohol.

It is preferred to use compounds which in addition are able to participate with the polyvinyl alcohol in the formation of complex compounds. Particular preference is given to the use of aluminum chloride or aluminum nitrate. The proportion of the acidic compound which additionally participates with polyvinyl alcohol in complex compounds is preferably at least 5% by weight, in particular from 10 to 50% by weight, based on the mass of the polyvinyl alcohol.

The aqueous polyvinyl alcohol compositions of the invention also can contain additives. Any additives can be used in the invention as long as they do not adversely affect the resistance of the compositions to boiling water or the extended stability of the compositions.

The invention also provides a process for preparing the novel polyvinyl alcohol compositions in the form of aqueous solutions, by first preparing an aqueous solution of the polyvinyl alcohol in the desired concentration range and mixing this solution with the at least one bifunctional aldehyde, masked completely as water-soluble hydrogen sulfite adduct, and with the acidic compound, preferably by adding aqueous solutions of these components. The sequence of addition is not critical. The solution typically has a sufficiently low pH, attainable through the choice of the acidic compounds, which simultaneously permits both hydrolysis of the hydrogen sulfite adducts controlled as a function of time and crosslinking of the polyvinyl alcohol by way of acetal linkages. This pH preferably is below 6, more preferably below 4.5 and most preferably below 3.5.

It also is possible to prepare the at least bifunctional aldehydes which are masked completely as hydrogen sulfite adduct in situ in the existing polyvinyl alcohol solution by adding the free aldehydes and amounts of alkali hydrogen sulfites, disulfites or pyrosulfites which are at least stoichiometric to the aldehyde groups present. This step preferably is undertaken before the addition of the acidic compound. It is possible, furthermore, to generate the free aldehydes in an acidic medium, preferably at a pH of below 6, initially from other cleavable aldehyde derivatives, for example from acetals, and to convert these aldehydes in situ into their hydrogen sulfite adducts by adding at least stoichiometric amounts of alkali metal hydrogen sulfites, disulfites or pyrosulfites. Examples of appropriate acetals include the cyclic acetals 2,5-dimethoxytetrahydrofuran, 2,5-diethoxytetrahydrofuran and 2,6-dimethoxytetrahydro-2H-pyran and 2,6-diethoxytetrahydro-2H-pyran. Particularly suitable compounds from this group include the bisdimethyl and bisdiethyl acetals of malonaldehyde, succinaldehyde and glutaraldehyde. Those skilled in the art are capable of generating the at least one bifunctional aldehydes in situ using the guidelines provided herein.

In principle, it is not critical whether the formation of the hydrogen sulfite adducts is quantitative in the case of the two latter variants, since following addition of the above-described salts, which in acidic aqueous solution provide an an equilibrium concentration of hydrogen sulfite ions, a pH-dependent equilibrium will first of all be established between the free aldehydes and their hydrogen sulfite adducts.

A further embodiment of a process for preparing the novel polyvinyl alcohol compositions in the form of aqueous solutions having an extended stability on storage for preparing films which crosslink at room temperature and are intended for producing films and adhesive bonds which are resistant to hot water comprises preparing a solid, homogeneous, water-soluble polyvinyl alcohol premix, preferably in the form of storage-stable polyvinyl alcohol granules, which as crosslinking component, already comprises the above-described aldehydes having at least 3 carbon atoms and being masked completely as hydrogen sulfite adduct and which is subsequently converted into an aqueous solution to which the above-described acidic compounds are added. The starting point for the preparation of this polyvinyl alcohol premix preferably is an at least partially water-soluble powder or granule of polyvinyl alcohol. Suitable polyvinyl alcohol granules preferably have particle diameters of from 0.1 to 5 mm. These granules preferably are admixed with the aldehydes having at least 3 carbon atoms which are masked completely as a hydrogen sulfite adduct, and preferably in the form of an aqueous solution, by means of a customary mixing apparatus, examples being tumble mixers, planetary stirrers or forced mixers. The amount of water supplied (if used) is such that the aldehydic crosslinking component is substantially absorbed by the granules, causing the latter to swell, during the mixing operation, with the result that drying of the granules results in a substantially homogeneous product. It is not necessary to supply heat during the mixing operation. In the course of subsequent drying of the premix, the temperatures should not exceed the thermal decomposition temperatures of the aldehyde derivatives. Those skilled in the art are capable of preparing a suitable solid, polyvinyl alcohol premix using the guidelines provided herein.

From this polyvinyl alcohol premix in the form of polyvinyl alcohol granules, it is possible in a manner known to skilled artisans to prepare a homogeneous aqueous solution which already comprises the aldehyde compounds masked as hydrogen sulfite. This solution can then be mixed with the above-described acidic compounds to provide the novel aqueous polyvinyl alcohol compositions.

In contrast to simple mixtures of dry polyvinyl alcohol granules with pulverulent hydrogen sulfite adducts of the at least bifunctional aldehydes having at least 3 carbon atoms, the premixes in the form of modified polyvinyl alcohol granules can be stored for months even under extreme storage conditions, for example at high atmospheric humidity, with the result that even after a prolonged period has elapsed, it is possible to obtain homogeneous aqueous solutions. Preferably, the compositions of the invention, and in particular, the premix of the invention, is stable in a moist atmosphere, i.e., over water, at 25° C., for t least 4 weeks, more preferably, more than 8 weeks, and most preferably more than 16 weeks.

The solid, homogeneous water-soluble polyvinyl alcohol premix and the process for its preparation are likewise provided by the present invention.

The novel polyvinyl alcohol compositions described, in the form of aqueous solutions, advantageously result in films and adhesive bonds that are resistant to boiling water without heat activation and relative to the prior art compositions, feature an improved stability on storage of at least 4 weeks. By further treatment at elevated temperature of the films produced, it is possible to improve still further their resistance to boiling water and to shorten the drying time.

The novel polyvinyl alcohol composition in the form of aqueous solutions are suitable for preparing adhesives for cellulosic substrates such as wood, paper or cards, in particular as water-resistant adhesives for wood and paper, for producing paper laminates and spiral or parallel sleeves. From the aqueous solutions, it also is possible to prepare cast films which are suitable as a water-resistant packaging material having good gas barrier properties, alone or as a constituent of laminates in composite films, or are suitable for use as a coating material for construction materials, for producing battery membranes or pressure permeation separating membranes for the separation of aqueous/organic mixtures. Other fields of use include sizes for textiles or glass fibers, as binders for nonwoven compounds, for producing water-resistant fibers, especially those intended for the reinforcement of construction materials, and also as electrophotographic transfer layers and as water vapor-permeable sanitary base layers.

The examples which follow serve to illustrate the invention. All parts and percentages are by weight unless noted otherwise.

EXAMPLES

Examples 1 to 3 and Comparison Examples C1 and C2

A partially hydrolyzed polyvinyl alcohol (100 parts by weight of a 10% strength solution) with a degree of hydrolysis of 88 mol-% and a viscosity, as a 4% strength aqueous solution at 20° C., of 18 mPa·s was admixed, whilst stirring, with 3.5 parts of a saturated, approximately 30% strength homogeneous solution of aluminum chloride in water. Subsequently, the additions set out in Table 1 were incorporated into the mixture by stirring. These solutions were used to produce cast films with a thickness of about 0.25 mm, which were dried at room temperature for 48 hours. To determine the fractions insoluble in boiling water, four sections each measuring about 2 cm×2 cm were taken from each film. One half was used to determine, in duplicate, the dry matter content $T_s$(%) (6 hours at 120° C.). The other half was weighed ($m_1$, $m_2$) and treated for two hours in boiling water. The film fractions insoluble in boiling water were then removed from the water bath and dried at 120° C. for 6 hours. ($m_{1k}$, $m_{2k}$). The percentage fractions insoluble in boiling water which are given in Table 1 are calculated in each case from $100 \times m_{ik}/(m_i \times T_s/100)$, the value stated being the mean of the two individual measurements:

TABLE 1

| Example | Addition | pH | Mol of cross-linker/mol of vinyl-OH | Fraction insoluble in boiling water % | Viscosity Brookfield 2/50 mPa·s | Viscosity Brookfield 2/50 after 4 weeks/mPa·s |
|---|---|---|---|---|---|---|
| 1 | 0.5 pbw GABNa 20% | 3.4 | 0.0018 | 28.6 | 366 | 535 |
| 2 | 2.5 pbw GABNa 20% | 3.4 | 0.009 | 93.8 | 322 | 528 |
| 3 | 5.0 pbw GABNa 20% | 3.4 | 0.018 | 93.9 | 299 | 532 |
| C1 | 0.65 pbw glutaraldehyde 50% | 3.4 | 0.018 | 94.9 | 394 | Gels after 24 hours |
| C2 | No addition | 3.4 | 0 | 0 | 364 | 448 |

Explanation: GABNa 20%: 20% strength aqueous solution of glutaraldehyde bis(sodium hydrogen sulfite) in water Example 4 and Comparison Example C3

This example illustrates a method for preparing a premix in the form of modified polyvinyl alcohol granules. A customary commercial forced mixer with a heating/cooling jacket (35 l capacity) was charged with 6 kg of partially hydrolyzed polyvinyl alcohol with a degree of hydrolysis of 88 mol-% and a viscosity, as a 4% aqueous solution, of 18 mPa·s. Under jacket cooling, the mixture was first of all stirred at a speed of 1200 rpm, at which the temperature rose slightly. On reaching a temperature of 40° C., a solution of 240 g of glutaraldehyde bis(sodium hydrogen sulfite) in 960 g of water was added over the course of 45 minutes. The temperature rose to a maximum of 49° C. The mixture was then cooled to below 40° C. at a speed of 600 rpm. The product was taken out and dried at 120° C. for 6 hours to a solids content of 99.6%. Analysis of the microscope image showed that homogeneous granules were present which were free from pulverulent secondary constituents.

Comparison Example C3

The same polyvinyl alcohol as used in example 4 was mixed with glutaraldehyde bis(sodium hydrogen sulfite) but without the addition of water. Analysis of the microscope image revealed the result to be a heterogeneous mixture comprising not only polyvinyl alcohol granules but also amorphous pulverulent constituents.

The products of Example 4 and of Comparison Example 3 then were stored under the following conditions:

Climate 1: open storage under laboratory climate conditions with fluctuating atmospheric humidity and temperature
Climate 2: Storage in a dry atmosphere (over silica gel) at 25° C.
Climate 3: Storage in a moist atmosphere (over water) at 25° C.

Following storage under the respective climatic conditions, the products were assessed in terms of visual appearance and the capacity for preparation of a 10% strength aqueous solution (90° C.). The results are summarized in Table 2 below:

TABLE 2

| Storage | Example | Visual assessment | 10% Strength solution |
|---|---|---|---|
| 4 weeks climate 1 | 4 | Granules unchanged | Clear solution |
| 4 weeks climate 1 | C3 | Product unchanged | Undissolved constituents |
| 4 weeks climate 2 | 4 | Granules unchanged | Clear solution |
| 4 weeks climate 2 | C3 | Product unchanged | Undissolved constituents |
| 4 weeks climate 3 | 4 | Slightly reduced flowability owing to moisture absorption | Clear solution |
| 4 weeks climate 3 | C3 | Caking | Undissolved constituents |
| 16 weeks climate 1 | 4 | Product unchanged | Clear solution |
| 16 weeks climate 2 | 4 | Product unchanged | Clear solution |
| 16 weeks climate 3 | 4 | Slightly reduced flowability owing to moisture absorption | Clear solution |

What is claimed is:

1. An aqueous polyvinyl alcohol solution comprising polyvinyl alcohol, at least one polyaldehyde having at least 3 carbon atoms and being masked completely as a water-soluble hydrogen sulfite adduct, and at least one compound which is acidic in water, said acidic compound being present in an amount sufficient so that the pH of said composition is below 4.5.

2. The polyvinyl alcohol solution as claimed in claim 1, wherein the polyvinyl alcohol has a degree of hydrolysis of from 80 to 98 mol-%.

3. The polyvinyl alcohol solution as claimed in claim 1, wherein the polyaldehyde is glutaraldehyde.

4. The polyvinyl alcohol solution as claimed in claim 1, wherein the molar ratio of hydrogen sulfite adduct to vinyl alcohol units is from 0.005 to 0.05:1.

5. The polyvinyl alcohol solution as claimed in claim 1, wherein the acidic compound is a water-soluble salt of a polyvalent cation.

6. The polyvinyl alcohol solution as claimed in claim 1, wherein the acidic compound is additionally able to form a complex compound with the polyvinyl alcohol.

7. The polyvinyl alcohol solution as claimed in claim 1, wherein the proportion of the acidic compound is from 10 to 50% by weight, based on the mass of the polyvinyl alcohol.

8. The polyvinyl alcohol solution as claimed in claim 1, wherein the polyvinyl alcohol has a Brookfield (2/50) viscosity, as a 4% strength aqueous solution, of from 2 to 70 mPa·s.

9. The polyvinyl alcohol solution as claimed in claim 8, wherein the polyvinyl alcohol has a viscosity, as a 4% strength aqueous solution, of from 18 to 40 mP·s.

10. The polyvinyl alcohol solution as claimed in claim 1, wherein the solution has a Brookfield (2/50) viscosity of below 10,000 mPa·s.

11. The polyvinyl alcohol solution as claimed in claim 1, wherein the solution has a Brookfield (2/50) viscosity of below 1,000 ·s.

12. A process for preparing a polyvinyl alcohol solution as claimed in claim 1, which comprises preparing an aqueous solution of polyvinyl alcohol and mixing the aqueous solution with (i) at least one polyaldehyde having at least 3 carbon atoms and being masked completely as a water-soluble hydrogen sulfite adduct and with (ii) at least one compound which is acidic in water.

13. A process for preparing a polyvinyl alcohol solution as claimed in claim 1, which comprises preparing an aqueous solution of polyvinyl alcohol and mixing the aqueous solution with: (i) at least one polyaldehyde having at least 3 carbon atoms, or an acetal of the at least one polyaldehyde; (ii) an amount of alkali metal hydrogen sulfite, alkali metal disulfite or alkali metal pyrosulfite which is at least stoichiometric to the polyaldehyde; and (iii) at least one compound which is acidic in water.

14. A process for preparing a polyvinyl alcohol solution as claimed in claim 1, which comprises homogeneously mixing an at least partially water-soluble polyvinyl alcohol powder or granules with the polyaldehyde which is masked completely as a hydrogen sulfite adduct to form a solid, homogeneous, water-soluble polyvinyl alcohol premix, dissolving the polyvinyl alcohol premix in water, and adding at least one compound which is acidic in water to the polyvinyl alcohol premix dissolved in water.

15. An adhesive comprising a polyvinyl alcohol solution as claimed in claim 1.

* * * * *